(12) United States Patent
Shukla

(10) Patent No.: US 9,365,658 B2
(45) Date of Patent: Jun. 14, 2016

(54) METHOD OF PHOTOCURING ACRYLATE COMPOSITIONS

(71) Applicant: Deepak Shukla, Webster, NY (US)

(72) Inventor: Deepak Shukla, Webster, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 0 days.

(21) Appl. No.: 14/507,024

(22) Filed: Oct. 6, 2014

(65) Prior Publication Data

US 2015/0024141 A1 Jan. 22, 2015

Related U.S. Application Data

(63) Continuation-in-part of application No. 12/945,994, filed on Nov. 15, 2010, now abandoned.

(51) Int. Cl.
| | |
|---|---|
| C08F 2/50 | (2006.01) |
| B05D 3/06 | (2006.01) |
| C08J 3/28 | (2006.01) |
| C09D 4/00 | (2006.01) |
| C08K 5/3432 | (2006.01) |
| C08K 5/3462 | (2006.01) |
| C08K 5/45 | (2006.01) |
| C08K 5/524 | (2006.01) |

(52) U.S. Cl.
CPC ... C08F 2/50 (2013.01); C08J 3/28 (2013.01); C09D 4/00 (2013.01); *B05D 3/06* (2013.01); *C08K 5/3432* (2013.01); *C08K 5/3462* (2013.01); *C08K 5/45* (2013.01); *C08K 5/524* (2013.01)

(58) Field of Classification Search
CPC ............ B05D 3/067; C08F 2/50; C09D 4/00; C08K 5/45; C08K 5/47; C08K 5/52; C08K 5/3432; C08K 5/3462
See application file for complete search history.

(56) References Cited

U.S. PATENT DOCUMENTS

| | | | |
|---|---|---|---|
| RE27,922 E | 2/1974 | Heseltine et al. | |
| RE27,925 E | 2/1974 | Jenkins et al. | |
| 4,743,528 A | 5/1988 | Farid et al. | |
| 4,743,530 A | 5/1988 | Farid et al. | |
| 5,091,280 A | 2/1992 | Yamaguchi et al. | |
| 5,759,212 A * | 6/1998 | Hall | ................. 8/529 |
| 6,014,929 A | 1/2000 | Teng | |
| 6,750,266 B2 * | 6/2004 | Bentsen et al. | ................. 522/2 |
| 7,422,708 B2 | 9/2008 | Kunze et al. | |
| 7,632,879 B2 | 12/2009 | Majumdar et al. | |
| 8,399,533 B2 | 3/2013 | Shukla | |
| 8,664,287 B2 | 3/2014 | Shukla | |
| 2003/0017336 A1 * | 1/2003 | Gedanken et al. | ............ 428/403 |
| 2005/0008880 A1 * | 1/2005 | Kunze | ................... C09D 11/52 428/447 |
| 2006/0128823 A1 * | 6/2006 | Tsuchimura | ......... C09D 11/101 522/71 |
| 2006/0181591 A1 | 8/2006 | Sugai | |
| 2009/0163615 A1 * | 6/2009 | Halahmi | ................ C09D 11/36 522/146 |
| 2012/0121815 A1 * | 5/2012 | Shukla | ........................ C08J 3/28 427/487 |
| 2012/0122664 A1 | 5/2012 | Shukla et al. | |
| 2012/0295035 A1 * | 11/2012 | Shukla | ...................... C08F 2/50 427/510 |

FOREIGN PATENT DOCUMENTS

| | | | |
|---|---|---|---|
| GB | 2 083 832 | | 3/1982 |
| JP | 56072062 A | * | 6/1981 |
| JP | 11352685 A | | 12/1999 |

OTHER PUBLICATIONS

Kaljurand et al: "Extension of the Self-Consistent Spectrophotometric Basicity Scale in Acetonitrile to a Full Span of 28 pKa Units: Unification of Different Basicity Scales", J. Org. Chem. 2005, 70, 1019-1028.*

Merriam-Webster's Collegiate Dictionary, tenth edition, p. 445.*

Shukla et al., J.Org. Chem. 70, No. 17, 6809-6819, Chain Amplification in Photoreactions of N-Alkoxypyridinium Salts with Alcohols: Mechanism and Kinetics , 2005.

* cited by examiner

Primary Examiner — Elena T Lightfoot

(74) Attorney, Agent, or Firm — J. Lanny Tucker

(57) ABSTRACT

Acrylate-containing compositions are photocured by mixing at least one N-oxyazinium salt photoinitiator, a photosensitizer for the N-oxyazinium salt, an N-oxyazinium salt efficiency amplifier, an aromatic heterocyclic, nitrogen-containing base, and one or more photocurable acrylates to form a photocurable composition. This photocurable composition is then irradiated to effect polymerization of the one or more acrylates. This method can be carried out in oxygen-containing environments.

10 Claims, No Drawings

METHOD OF PHOTOCURING ACRYLATE COMPOSITIONS

CROSS-REFERENCE TO RELATED APPLICATIONS

This application is a continuation-in-part of and commonly assigned U.S. patent application Ser. No. 12/945,994, filed Nov. 15, 2010, now abandoned.

Also referenced is pending and commonly assigned U.S. patent application Ser. No. 14/244,941 that was filed Apr. 4, 2014, which also is a continuation-in-part of U.S. patent application Ser. No. 12/945,994 noted above.

FIELD OF THE INVENTION

This invention relates to a method of photocuring acrylates or acrylate-containing compounds including photocurable resins. This method enables the polymerization of the acrylates in air because oxygen is not an inhibitor with the use of unique photocurable compositions.

BACKGROUND OF THE INVENTION

N-oxyazinium salts are known to be photoinitiators for photocrosslinking and photopolymerization as described for example in U.S. Pat. Reissues 27,922 and 27,925 (both Heseltine et al.). Since most N-oxyazinium salt initiators absorb light in UV region of the electromagnetic spectrum, it is common practice to employ a photosensitizer co-initiator to increase their spectral response.

It is generally accepted that photosensitizing co-initiators function by absorption of a photon that results in excitation of an electron from an occupied molecular orbital to a higher energy, unoccupied orbital. The spin of the electron excited to the higher energy orbital corresponds to that which it exhibits in its original orbital or ground state. Thus, the photosensitizer in its initially formed excited state is in a singlet excited state. The lifetime of the singlet excited state is limited, typically less than a few nanoseconds. The excited photosensitizer can return from its singlet excited state directly to its original ground state, dissipating the captured photon energy. Alternatively, the singlet excited state photosensitizer in some instances undergoes intersystem crossing through spin inversion to another excited state, referred to as a triplet state, wherein lifetimes are typically in the microsecond to millisecond range. Since photosensitizer co-initiators that exhibit triplet states have longer lifetimes, the presence of the photosensitizer co-initiators provides a much longer time period for reaction.

GB Publication 2,083,832 (Specht et al.) describes photocurable compositions that comprise N-oxyazinium salts and co-initiators based on amino-substituted ketocoumarin triplet photosensitizers. The amino-substituted ketocoumarins exhibit very high intersystem crossing (or triplet state generation) efficiencies ranging well above 10%. U.S. Pat. No. 4,743,528 (Farid et al.) disclose a photocurable composition comprising an N-oxyazinium salt, an N-oxyazinium activator, and a photosensitizer having a reduction potential that in relation to the reduction potential of the N-oxyazinium salt activator is at most 0.1 V more positive, and an electron rich amino-substituted benzene. Similarly, U.S. Pat. No. 4,743,530 (Farid et al.) describes photocurable compositions containing an N-oxyazinium salt activator and a dye based photosensitizer with maximum absorption above 550 nm and having a reduction potential relative to that of N-oxyazinium salt activator is at most 0.1 V more positive.

N-oxyazinium salts have been demonstrated as useful sources of radicals for photoinitiating polymerization. Single electron transfer from an excited electron donor (D*) to an N-oxyazinium salt results in N—O bond cleavage and the formation of an oxy radical, as shown below in Equation (1).

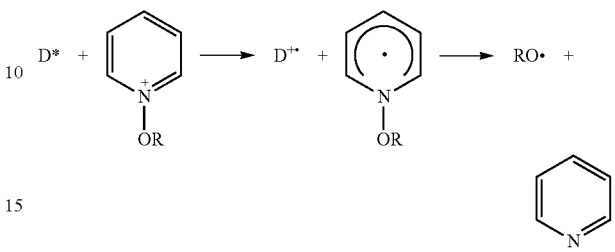

Although a number of dye-based, as well as, triplet ketocoumarin-based photosensitizing co-initiators have been used to initiate photopolymerization using N-oxyazinium salts, most of them have limited curing speed. This is usually due to overall lower quantum efficiency of the process. The quantum yield of a radiation-induced process is the number of times that a defined event occurs per photon absorbed by the system. The event could be the decomposition of a reactant molecule.

In the case of photopolymerization using N-oxyazinium salts and ketocoumarin triplet photosensitizers, the overall quantum efficiency of oxy radical generation is less than or equal to the triplet formation efficiency (the limiting quantum efficiency being defined as state efficiency for reaction times the quantum yield for formation of the reacting state). With dye-based photosensitizers, the overall quantum efficiency is expected to be even lower due to a shorter lifetime of excited dye.

To increase the overall efficiency of a photocuring process, some degree of amplification is necessary. That is, amplification of photoreactions where one photon leads to the transformation of several reactant molecules to products. In some cases, the commercial viability of certain systems can depend on whether a relatively modest amplification, for example, in the 10 to 100 times range, could be achieved. This depends usually upon limitations on exposure time, light intensity, or a combination that can be imposed on a specific use.

In most known amplified photochemical processes, amplification is based on photochemical generation of a species that is subsequently used to catalyze another reaction. Very few examples of amplified photoreactions are known where one photon leads to the transformation of several reactant molecules to products. Most of these quantum-amplified electron-transfer processes involve radical cation reactions, such as valence isomerization, for example, the transformation of hexamethyldewarbenzene to hexamethylbenzene, or the cyclization or cycloreversion between two olefin moieties and a cyclobutane, where quantum yields as high as several hundred have been obtained in polar solvents. In these reactions, the chain is propagated via electron transfer from a reactant molecule (R) to the radical cation of the product (P.$^+$).

Another type of chain-amplified photoreaction involves two reactants where one is oxidized (leading, for example, to dehydrogenation) and the other is reduced. A different kind of chain reaction involving two reactants is that of onium salts. In these reactions, upon one electron reduction an onium salt (Ar—X$^+$) undergoes fragmentation to yield an aryl radical, which in turn takes a hydrogen atom from an alcohol to give an α-hydroxyl radical. Chain propagation occurs through electron transfer from the α-hydroxyl radical to another onium salt molecule.

Amplified photosensitized electron transfer reactions of N-methoxypyridinium salts with alcohols of diverse structures were recently demonstrated (Shukla et al., *J. Org. Chem.* 70, 6809-6819.) to achieve quantum efficiencies of ~10-20, even at modest reactant concentrations of 0.02-0.04 M, and in spite of the endothermicity of the critical electron transfer step from the intermediate α-hydroxy radical to the pyridinium salt. These reactions can be initiated by a number of singlet or triplet sensitizers, with varying degrees of initiation efficiencies that can be as high as 2.

A number of photoinitiators and photocurable compositions have been developed and commercialized to carry out free radical chain polymerization. In most of these methods, free radicals are produced by either of two pathways:

(1) the photoinitiator undergoes excitation by energy absorption with subsequent decomposition into one or more radicals, or (2) the photoinitiator undergoes excitation and the excited species interacts with a second compound (by either energy transfer or a redox reaction) to form free radicals from the latter or former compound(s).

Most known photoinitiators have only moderate quantum yields (generally less than 0.4), indicating that the conversion of light radiation to radical formation needs to be made more efficient. Thus, there are continuing opportunities for improvements in the use of photoinitiators in free radical polymerization.

In photopolymerization technology, there still exists a need for highly amplified photochemistry, and easy to prepare and easy to use photocurable compositions. The need for amplified photocurable compositions is particularly acute where absorption of light by the reaction medium may limit the amount of energy available for absorption by the photoinitiators. For example, in the preparation of color filter resists, highly pigmented resists are required for high color quality. With the increase in pigment content, the curing of color resists becomes more difficult. The same is true for the UV-photocurable inks, for example offset printing inks, which also are loaded with pigments. Hence, there is a need for a photocurable composition having a higher sensitivity and excellent resolution properties. In addition, there is a need for such photocurable compositions to meet the industrial properties such as high solubility, thermal stability, and storage stability.

Besides the challenges above that are often encountered in free radical curing, there is an additional challenge of free radical photocuring inhibition by the presence of oxygen. Oxygen inhibition has always been a problem for photocuring of compositions containing multifunctional acrylate monomers or oligomers using a photoinitiated radical polymerization (for example, see Decker et al., *Macromolecules* 18 (1985) 1241.). This oxygen inhibition is due to the rapid reaction of carbon centered propagating radicals with oxygen molecules to yield peroxyl radicals. These peroxyl radicals are not as reactive towards carbon-carbon unsaturated double bonds and therefore do not initiate or participate in any photopolymerization reaction. Oxygen inhibition usually leads to premature chain termination that results in incomplete photocuring. Thus, many photocuring processes must be carried out in inert environments (for example, under nitrogen or argon), making such processes more expensive and difficult to use in industrial and laboratory settings.

Various methods have been proposed to overcome oxygen inhibition of photocuring:

(1) Amines that can undergo a rapid peroxidation reaction can be added to consume the dissolved oxygen. However, the presence of amines in acrylate-containing compositions can cause yellowing in the resulting photocured composition, create undesirable odors, and soften the cured composition because of chain transfer reactions. Moreover, the hydroperoxides thus formed will have a detrimental effect on the weathering resistance of the UV-cured composition.

(2) Dissolved oxygen can be converted into its excited singlet state by means of a red light irradiation in the presence of a dye sensitizer. The resulting $^1O_2$ radical will be rapidly scavenged by a 1,3-diphenylisobenzofuran molecule to generate a compound (1,2-dibenzoylbenzene) that can work as a photoinitiator (Decker, *Makromol. Chem.* 180 (1979), p. 2027). However, the photocured composition can become colored, in spite of the photobleaching of the dye, prohibiting this technique for use in various products.

(3) The photoinitiator concentration can be increased to shorten the UV exposure during which atmospheric oxygen diffuses into the cured composition. This technique can also be used in combination with higher radiation intensities. Oxygen inhibition can further be reduced by using high intensity flashes that generate large concentrations of initiator radicals reacting with oxygen, but hydroperoxides are also formed.

(4) Free radical photopolymerization can be carried out under inert conditions (Wight, *J. Polym. Sci.: Polym. Lett. Ed.* 16 (1978) 121), which is the most efficient way to overcome oxygen inhibition. Nitrogen is typically continuously used to flush the photopolymerizable composition during UV exposure. On an industrial UV-curing line, which cannot be made completely airtight, nitrogen losses can be significant, thus making the process expensive and inefficient. This is an even greater concern if argon is used to provide an inert environment.

Other less common ways of overcoming oxygen inhibition of acrylate photopolymerization include using a wax barrier and performing UV exposure under water. Each of these techniques has disadvantages that have made them less likely for commercial application.

Thus, there is a need to provide highly efficient photocuring or photopolymerization of acrylate-containing compositions using N-oxyazinium salts without the need for inert environment or use of other known methods for reducing oxygen inhibition of free radical formation and reaction.

SUMMARY OF THE INVENTION

This invention provides method of photocuring an acrylate-containing composition comprising:

mixing at least one N-oxyazinium salt photoinitiator, a photosensitizer for the N-oxyazinium salt photoinitiator, an N-oxyazinium salt efficiency amplifier, an aromatic heterocyclic, nitrogen-containing base, one or more photocurable acrylates, and optionally one or more inert organic solvents, to form a photocurable composition, wherein the aromatic heterocyclic, nitrogen-containing base has a $pK_a$ of at least 10 and up to and including 22 in acetonitrile, and irradiating the photocurable composition to effect polymerization of the one or more acrylates.

The present invention solves some of difficulties and problems described above by the discovery of the use of a more efficient photocurable composition for utilizing radiation in photocuring operations. The photocurable composition used in the method of the present invention provides high sensitivity and storage stability that can be useful in the photocuring technologies. Accordingly, the photocurable composition used in this invention can efficiently generate a reactive species with a combination of an N-oxyazinium salt photoinitiator, a photosensitizer for the N-oxyazinium salt, and an N-oxyazinium salt efficiency amplifier, which in many embodiments, is an organic phosphite that can be also referred to as a quantum yield amplifier, and a base that is a aromatic heterocyclic, nitrogen-containing compound. This photocurable composition can be combined with a suitable aromatic heterocyclic, nitrogen-containing base that provides even greater photocuring efficiency especially for dry coatings of the acrylic-containing photocurable composition.

One of the advantages of the present invention is that, when combined with a polymerizable material such as an acrylate, the various photoinitiator components and the aromatic heterocyclic, nitrogen-containing base cause rapid curing times in comparison to the curing times known in the prior art. For example, surprisingly, the photocurable composition used in this invention performs unexpectedly better (higher quantum efficiency) than known N-oxyazinium salt-containing photocurable compositions. This advantage is achieved particularly by using the N-oxyazinium salt efficiency amplifier that was not previously known to accomplish this purpose, and by including the aromatic heterocyclic, nitrogen-containing base. This accomplishes photocuring with an efficient use of the radiation because many reactive species are generated per photon absorbed (that is, amplification) occurs. A relatively large amount of material can be photocured with reduced exposure to radiation.

Yet another important advantage of the present invention is that the photocurable composition can be used for in oxygen-containing environments. Because of the high efficiency of the photocurable composition, the presence of oxygen, or oxygen inhibition, is not a serious detriment during photocuring.

Because the photocuring speeds are high using the present invention, the photocurable compositions can be pigmented or used with compositions into which light penetration is limited. It is also possible to use the present invention for partial curing of photocurable compositions for example to modify their viscosities such during ink jetting operations or flexographic printing.

DETAILED DESCRIPTION OF THE INVENTION

Definitions

Unless otherwise indicated, the term "photocurable composition" used in this application will refer to embodiments used in the practice of the present invention.

The term "polymerization" is used herein to mean the combining for example, by covalent bonding, of large number of smaller molecules, such as monomers, to form very large molecules, that is, macromolecules or polymers. The monomers may be combined to form only linear macromolecules or they may be combined to form three-dimensional macromolecule, commonly referred to as crosslinked polymers.

As used herein, the terms "curing" and "photocuring" mean the polymerization of functional oligomers and monomers, or even polymers, into a crosslinked polymer network. Curing is the polymerization of unsaturated monomers or oligomers in the presence of crosslinking agents.

The terms "unsaturated monomer," "functional oligomer," and "crosslinking agent" are used herein with their usual meanings and are well understood by those having ordinary skill in the art.

The singular form of each component of the photocurable composition is intended also to include the plural that is, one or more of the respective components.

The term "unsaturated polymerizable material" is meant to include any unsaturated material having one or more carbon-to-carbon double bonds (ethylenically unsaturated groups) capable of undergoing polymerization. The term encompasses unsaturated monomers, oligomers, and crosslinking agents. The singular form of the term is intended to include the plural. Oligomeric and multifunctional acrylates are examples of unsaturated polymerizable materials.

The term "quantum yield" is used herein to indicate the efficiency of a photochemical process. More particularly, quantum yield is a measure of the probability that a particular molecule will absorb a quantum of light during its interaction with a photon. The term expresses the number of photochemical events per photon absorbed. Thus, quantum yields can vary from zero (no absorption) to a very large number (for example, $10^3$). In this context, the quantum efficiency of an N-oxyazinium salt photoinitiator is defined as in the following equation:

$$\Phi = \text{Quantum Efficiency} = \frac{\text{\# reactant alkoxyl radicals generated}}{\text{\# photons absorbed}}$$

The term "photosensitizer" is meant to refer to a light absorbing compound used to induce photocuring. Upon photoexcitation, the photosensitizer leads to one-electron reduction of the N-oxyazinium salt photoinitiator.

The terms "activator" and "photoinitiator" refer to an N-oxyazinium compound that accepts an electron from an excited sensitizer, a process that leads to fragmentation of the activator to give an oxy radical that initiates polymerization.

The terms "quantum yield amplifier" and "efficiency amplifier" refer to a compound that increases the quantum efficiency of the overall photocuring or photopolymerization process.

The terms "photocurable" and "curable" refer to a material that will polymerize when irradiated for example with radiation such as ultraviolet (UV), visible, or infrared radiation in the presence of the photocurable composition. "Actinic radiation" is any electromagnetic radiation that is capable of producing photochemical action and can have a wavelength of at least 150 nm and up to and including 1250 nm, and typically at least 300 nm and up to and including 750 nm.

The term "flexographic printing precursor" refers to some embodiments of elastomeric relief elements that can be used in the practice of this invention. The flexographic printing precursors include flexographic printing plate precursors, flexographic printing sleeve precursors, and flexographic printing cylinder precursors, all of which can be suitably imaged to provide a relief image to have an average relief image depth of at least 50 µm and up to and including 1000 µm, or at least 100 µm and up to and including 600 µm, relative to the uppermost relief surface. Any desired minimum and maximum relief image depths can be achieved based on a given elastomeric relief element and the printed pattern that is desired. Such elastomeric relief elements can also be known as "flexographic printing plate blanks", "flexographic printing cylinder blanks", or "flexographic sleeve blanks". The elastomeric relief elements can also have seamless or continuous forms.

Flexographic printing precursors can be used to provide relief printing members comprising a relief image.

Uses of the Photocurable Compositions

The photocurable compositions described herein can be used to cause photocuring or polymerization of various photocurable compounds used for coatings, printable inks, paints, photoresists, or any photocurable imaging compositions.

The present invention can be used to provide and photocure a photocurable composition comprised of an organic component containing polymerizable materials that are capable of crosslinking such as acrylate-containing compounds, an N-oxyazinium salt photoinitiator (or activator), a photosensitizer for the N-oxyazinium salt photoinitiator, which photosensitizer has a reduction potential that in relation to the reduction potential of the N-oxyazinium salt photoinitiator, is at most 0.1 volt more positive, an N-oxyazinium salt efficiency amplifier, and an aromatic heterocyclic, nitrogen-containing base. Each of the components of the photocurable composition is described below and each of these components can be obtained from various commercial chemical suppliers. The photocurable composition and its components can be provided in any form that is suitable for the intended use.

Photocurable Compositions

N-Oxyazinium Salts:

The N-oxyazinium salt photoinitiators used in this invention are N-oxy-N-heterocyclic compounds having a heterocyclic nucleus, such as a pyridinium, diazinium, or triazinium nucleus. The N-oxyazinium salt can include one or more aromatic rings, typically carbocyclic aromatic rings, fused with the N-oxy-N-heterocyclic compound, including quinolinium, isoquinolinium, benzodiazinium, phenanthridium, and naphthodiazinium. Any convenient charge balancing counter-ion can be employed to complete the N-oxyazinium salt photoinitiators, such as halide, fluoroborate, hexafluorophosphate, and toluene sulfonate. The oxy group (—O—$R_1$) of the N-oxyazinium compound can be selected from among a variety of synthetically convenient oxy groups. The N-oxyazinium salt photoinitiators can also be oligomeric or polymeric compounds.

The N-oxyazinium salt photoinitiator can have a reduction potential less negative than −1.4 V and comprise an N-oxy group that is capable of releasing an oxy radical when irradiated of the photocurable composition.

Representative N-oxyazinium salts are represented by the following Structure (I):

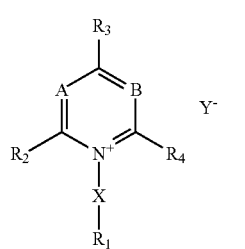

wherein A and B in Structure (I) independently represent a carbon, C—$R_5$, C—$R_6$, or nitrogen. X is oxygen (O).

$R_1$, $R_2$, $R_3$, $R_4$, $R_5$, and $R_6$ are independently hydrogen, or substituted or unsubstituted alkyl groups having 1 to 12 carbon atoms or aryl groups having 6 or 10 carbon atoms in the carbocyclic ring, which groups can be substituted with one or more acyloxy, alkoxy, aryloxy, alkylthio, arylthio, alkylsulfonyl, thiocyano, cyano, halogen, alkoxycarbonyl, aryloxycarbonyl, acetal, aroyl, alkylaminocarbonyl, arylaminocarbonyl, alkylaminocarbonyloxy, arylaminocarbonyloxy, acylamino, amino, alkylamino, arylamino, carboxy, sulfo, trihalomethyl, alkyl, aryl, heteroaryl, alkylureido, arylureido, succinimide, phthalimido groups, —CO—$R_7$ wherein $R_7$ is a substituted or unsubstituted alkyl or a substituted or unsubstituted aryl group, or —(CH=CH)$_m$—$R_8$ wherein $R_8$ is a substituted or unsubstituted aryl group or a substituted or unsubstituted heterocyclic group.

Any of the A, B, and R groups where chemically feasible can be joined to form a ring. Y is a suitable charge balancing anion that can be a separate charged moiety or a charged part of an A, B, or R group.

Other useful N-oxyazinium salts are represented by the following Structure (II):

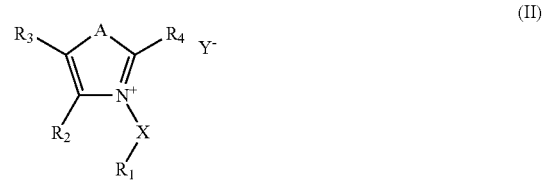

wherein A in Structure (II) represents carbon, C—$R_5$, nitrogen, sulfur, or oxygen with sufficient bonds and substituents to form a heteroaromatic ring. X is oxygen (O). $R_1$, $R_2$, $R_3$, $R_4$, and $R_5$ are independently hydrogen, or substituted or unsubstituted alkyl or aryl groups as described above for Structure (I), or any two R groups may form a ring. Y is a charge balancing anion that can be a separate charged moiety or part of a charged R group.

In some embodiments of Structures (I) and (II), $R_1$ is a substituted or unsubstituted alkyl group having 1 to 18 carbon atoms or a substituted or unsubstituted aryl group having 6 or 10 carbon atoms in the aromatic ring.

Other useful N-oxyazinium salt photoinitiators having a cation can be represented by the following formulae:

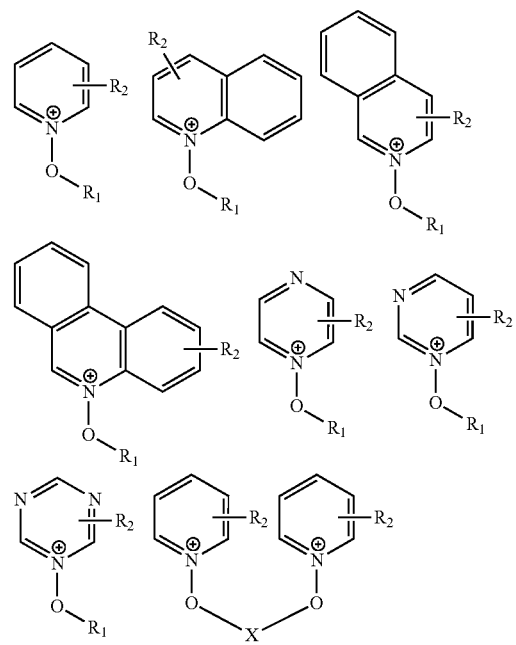

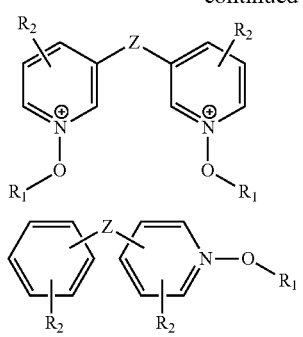

wherein $R_1$ represents a substituted or unsubstituted alkyl group, substituted or unsubstituted aryl group, or an acyl group, as described above, and wherein $R_1$ can also include a charge balancing anion, the $R_2$ groups independently represent hydrogen, or substituted or unsubstituted alkyl, aryl, or heteroaryl groups. Z is a substituted or unsubstituted aliphatic linking group having 1 to 12 atoms in the linking chain.

Other useful N-oxyazinium salt photoinitiators are illustrated by Structures III and IV and the compounds shown in TABLES 1 and 2 of U.S. Pat. No. 7,632,879 (Majumdar et al.) that is incorporated herein by reference for this teaching.

Particularly useful N-oxyazinium salt photoinitiators are compounds OZ-1 to OZ-16 identified below in TABLE I.

TABLE I

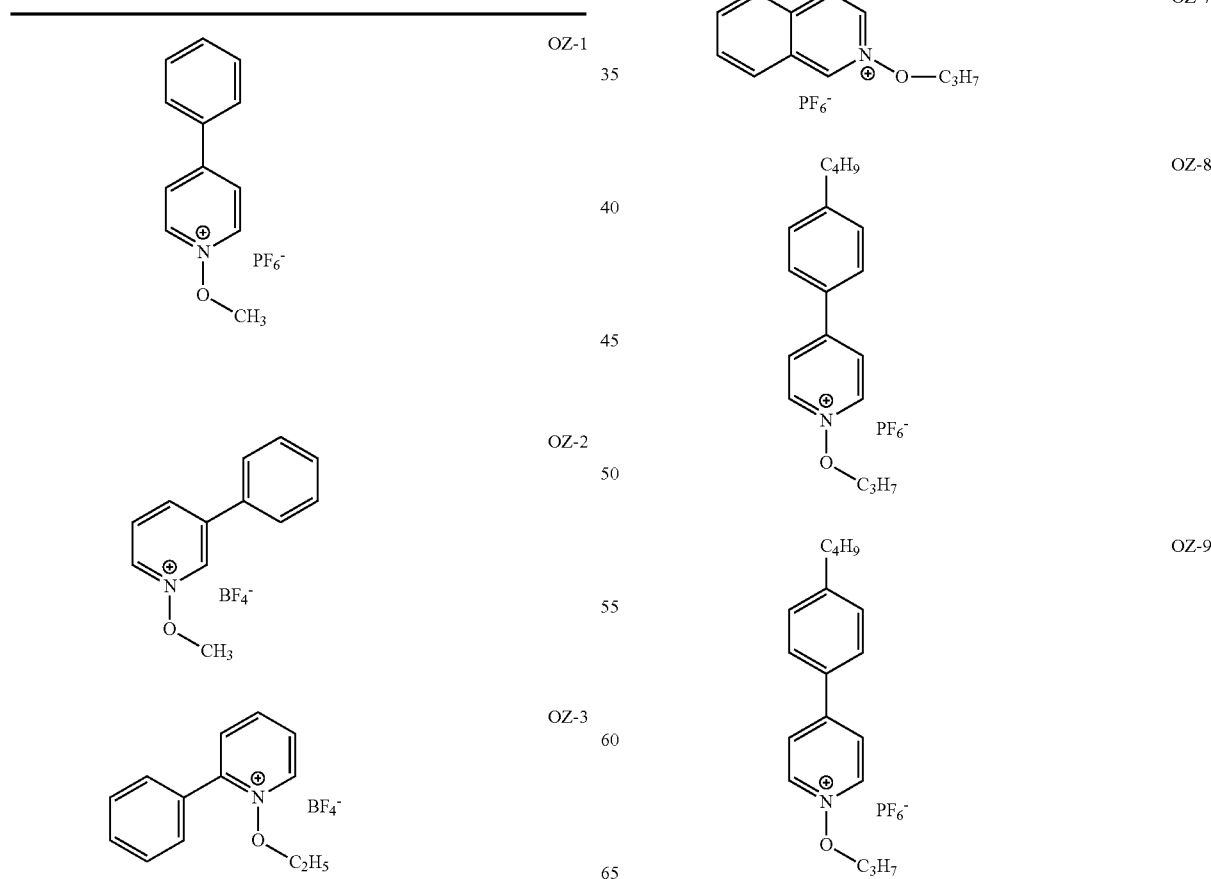

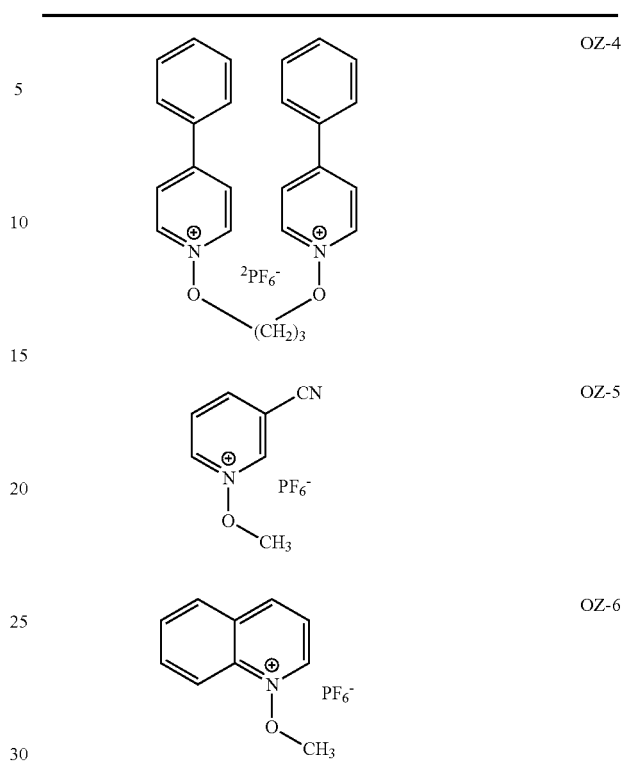

TABLE I-continued

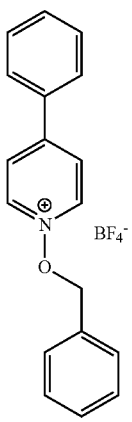 OZ-10

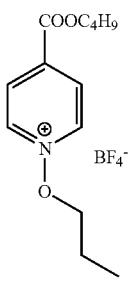 OZ-11

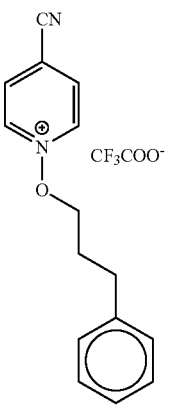 OZ-12

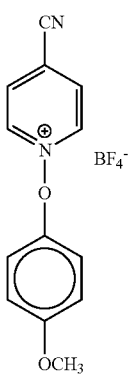 OZ-13

TABLE I-continued

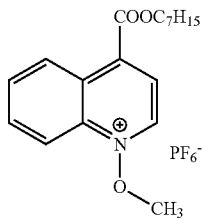 OZ-14

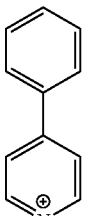 OZ-15

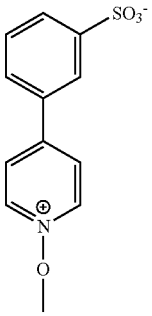 OZ-16

Mixtures of N-oxyazinium salt photoinitiators can be used if desired, and the total amount of N-oxyazinium salt photoinitiators in the photocurable composition can be generally at least 10 weight %, or typically at least 40 and up to and including 80 weight % based on the total weight of N-oxyazinium salt photoinitiator, photosensitizer for the N-oxyazinium salt photoinitiator, aromatic nitrogen-containing based, and N-oxyazinium salt efficiency amplifier.

Photosensitizers:

The photosensitizer (S) for the N-oxyazinium salt photoinitiator initiates the reaction of the N-oxyazinium salt photoinitiator following absorption of suitable radiation having a 4, of at least 150 and up to and including 1250 nm. The photosensitizer generally has a triplet energy of at least 20 kcal/mole of N-oxyazinium salt photoinitiator. As long as the reduction potential of the photosensitizer can be more negative than that of the N-oxyazinium salt photoinitiator (that is, it is harder to reduce), the photoinduced electron transfer reaction will be exothermic. The photoinitiated process produces the reactive oxy radical by electron transfer from the excited state of the photo sensitizer (*S) to the N-oxyazinium salt photoinitiator. The oxy radical can subsequently react with the N-oxyazinium salt efficiency amplifier, such as a trialkylphosphite, producing a suitable radical such as a phosphoranyl radical that can in turn transfer an electron to the N-oxyazinium salt photoinitiator to continue the chain process, Mixtures of photo sensitizers can be used if desired and the photosensitizers in the mixture can absorb at the same or different wavelengths.

Thus, the photo sensitizer is capable of transferring an electron from its own lowest excited state after it has absorbed radiation. The driving force for this process depends upon: (a) the excitation energy of the sensitizer, $(E^{excit})_S$, (b) its oxidation potential, $(E^{ox})_S$, (c) the reduction potential of the N-oxyazinium salt photoinitiator, $(E^{red})_{N\text{-}oxy}$, and (d) an energy increment $\Delta$ that varies from near zero in polar solvents such as acetonitrile to about 0.3 eV in nonpolar media. Thus, for the photoinduced electron transfer to be exothermic (that is, for the energy stored in the excited state to exceed the energy stored in the electron transfer products) the relationships shown in the following Equation 7 should be satisfied:

$$(E^{excit})_S > (E^{OX})_S - (E^{red})_{N\text{-}oxy} + \Delta \qquad (7)$$

The excitation energy of the sensitizer, $(E^{excit})_S$, could be that of the singlet or the triplet state depending on which of these states react with the N-oxyazinium salt photoinitiator.

The amount of photosensitizer used in the photocurable composition depends largely on its optical density at the wavelength(s) of radiation used to initiate the photoinduced electron transfer to an N-oxyazinium salt. Solubility of the photosensitizer in a photocurable composition can also be a factor. It is possible that the photosensitizer is a covalently bound part of a polymerizable material such as an acrylate. Either a photosensitizer bound in this manner or a non-bound photosensitizer with a low extinction coefficient can be utilized at relatively high levels to help facilitate the transfer of an electron to an N-oxyazinium salt from triplet sensitizer ($^3$S). When covalently attached to a polymeric material, the photosensitizer can comprise at least 0.01 and up to and including 10% based on the total weight of the N-oxyazinium salt photoinitiator. An example of such a covalently bound photosensitizer can be a naphthalene moiety (that absorbs actinic radiation) that can be bound to polymerizable or photocurable material, or it can be attached to an inert polymeric binder. The amount of the photosensitizers can be generally governed by their molar absorptivity or extinction coefficient. Photosensitizers that are not bound to curable compounds or polymers can be present in an amount of at least 1 and up to and including 10 weight %, based on the total weight of N-oxyazinium salt photoinitiator, photosensitizer for the N-oxyazinium salt photoinitiator, aromatic nitrogen-containing base, and N-oxyazinium salt efficiency amplifier.

The triplet energies of the photosensitizers used in this invention can be obtained in a variety of ways. Energies for some photosensitizers or closely related analogs are disclosed in the literature. For most photosensitizers, the lowest triplet state energies can be obtained from low temperature (for example, 77° K) phosphorescence spectra. The photosensitizer can be typically dissolved in a solvent (such as ethyl acetate) or a mixture of solvents and the solution can be placed in an optical cell and immersed in liquid nitrogen. The photosensitizer can be then excited with radiation at a wavelength where it absorbs, and its phosphorescence spectrum can be measured. The highest energy absorption band (the so-called 0-0 band) in the phosphorescence spectrum can usually be taken as the energy of the lowest triplet state of the photosensitizer. For photo sensitizers with weak or obscured emission or in which the ground state and lowest triplet state have substantial differences in geometry, triplet energies can be obtained either from rates of energy transfer from a series of molecules with known triplet energies or from measured equilibria with triplets of known energies. The former procedure is described in *J. Amer. Chem. Soc.* 102, 2152 (1980) and the latter procedure is described in *J. Phys. Chem.* 78, 196 (1974). In polymer matrices, photosensitizers and other compounds can occupy sites of different polarity, such that exact triplet energies are site dependent. To the extent that this is true for the photosensitizers and co-sensitizers (see below) used in this invention, the reported triplet energies represent approximate or average values.

Especially useful photosensitizers absorb visible light or near ultraviolet light, for example at a wavelength of at least 300 and up to and including 750 nm. The ketocoumarins disclosed in Tetrahedron 38, 1203 (1982) represent one class of useful photosensitizers. The ketocoumarins described in U.K. Patent Publication 2,083,832 (Specht et al.) are also useful photosensitizers. The ketocoumarins exhibit very triplet state generation efficiencies.

Other classes of useful photosensitizers include but are not limited to, xanthones, thioxanthones, arylketones, and polycyclic aromatic hydrocarbons.

Examples of specific useful triplet photosensitizers include but are not limited to, compounds S-1 through S-10 shown below in TABLE II. The illustrated photosensitizers can optionally contain substituents as methyl, ethyl, phenyl, aryl, methoxy, and chloro groups to modify various properties such as solubility, absorption spectrum, and reduction potential.

TABLE II

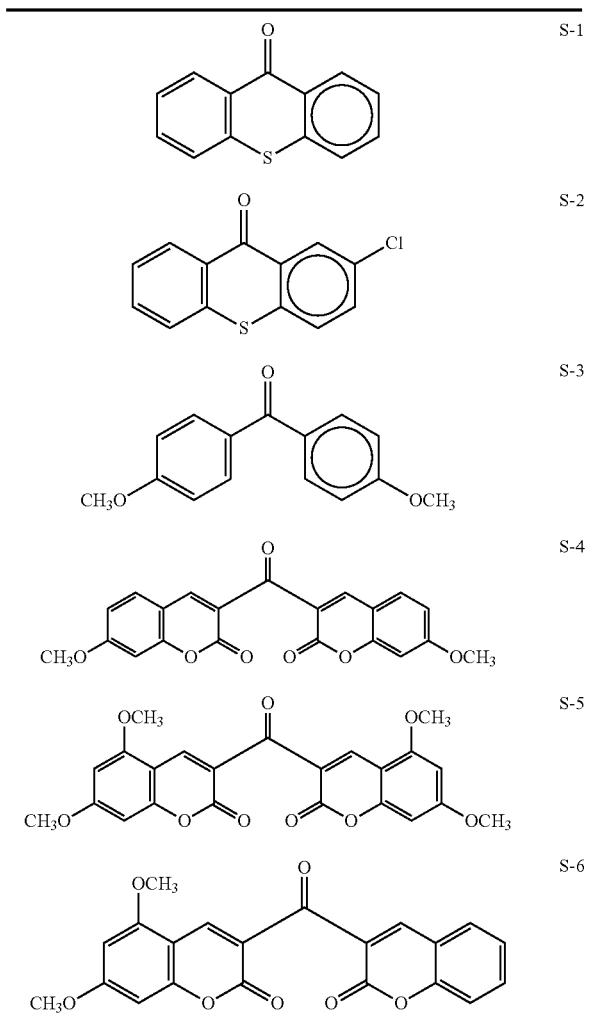

TABLE II-continued

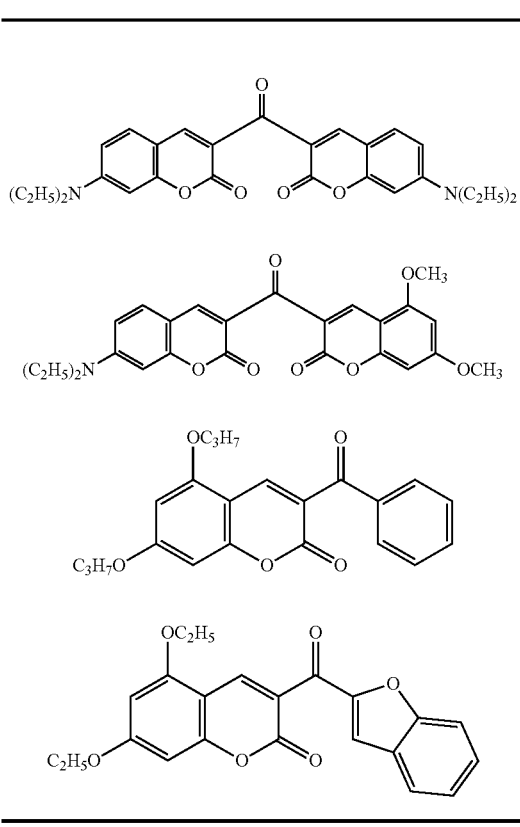

In some embodiments of this invention, the photosensitizer can be a dye, which can be any dye that by reaction with an N-oxyazinium salt photoinitiator leads to the formation of an oxy radical, which initiates polymerization. The useful classes of photosensitizer dyes can be for example, cyanine dyes, complex cyanine dyes, merocyanine dyes, complex merocyanine dyes, homopolar cyanine dyes, styryl dyes, oxonol dyes, hemioxonol dyes, hemicyanine dyes, squarilium dyes, coumarin dyes, rhodamine dyes, acridine dyes, and oxanol dyes. Representative photosensitizer dyes are described for example in *Research Disclosure*, Item 36544, September 1996, the disclosure of which is incorporated herein by reference. Some useful photosensitizer dyes are described in U.S. Pat. No. 4,743,530 (noted above) that is incorporated herein by reference. In general, any dye having a reduction potential that is at most 0.1 V more positive than the reduction potential of an N-oxyazinium salt photoinitiator can be effectively used as a photosensitizer.

Particularly useful photosensitizing cyanine or merocyanine dyes are shown by the general formulae D-1 to D-7 below in TABLE III.

TABLE III

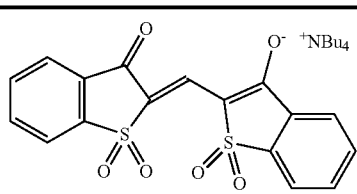

TABLE III-continued

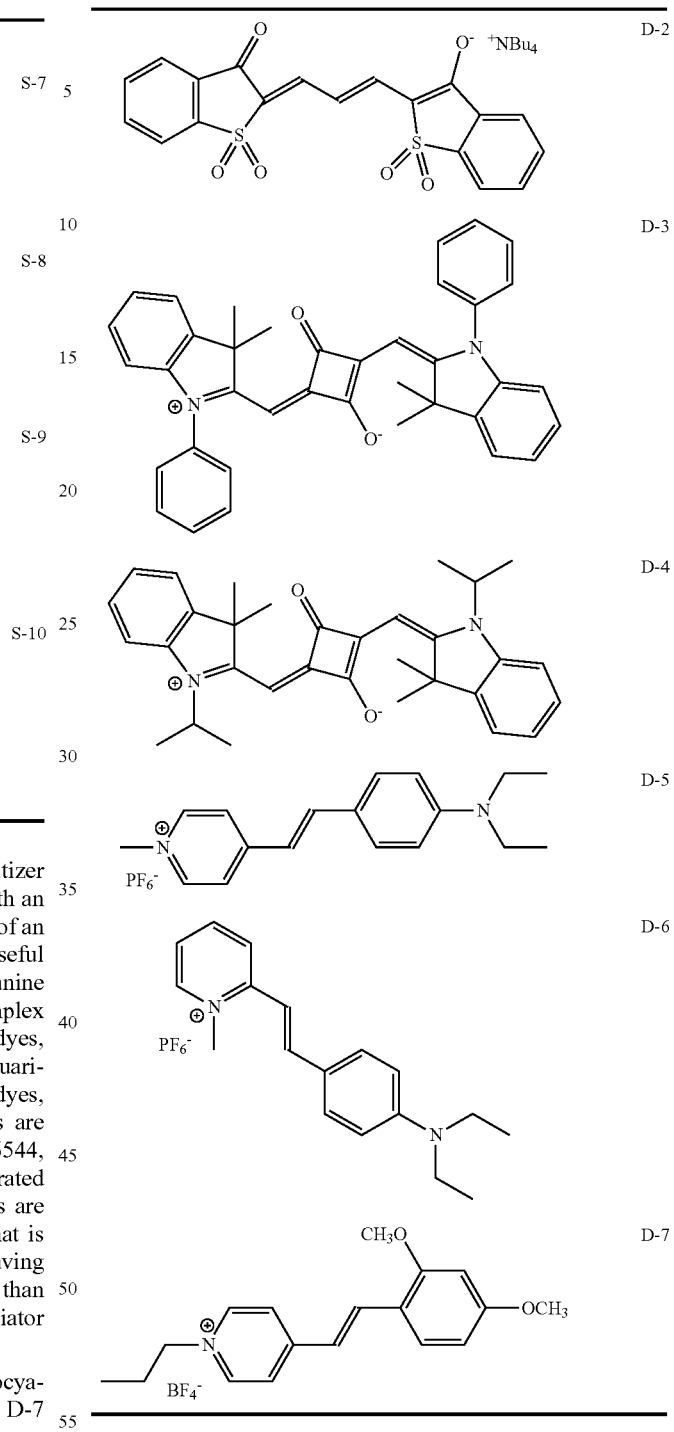

N-Oxyazinium Salt Efficiency Amplifiers:

The photocurable composition used in this invention includes one or more N-oxyazinium salt efficiency amplifiers. These efficiency amplifiers can be phosphites such as organic phosphites.

Useful organic phosphites for the present invention can be represented by the formula:

$(R'O)_3P$ wherein the multiple R' groups are the same or different substituted or unsubstituted alkyl groups having 1 to 20 carbon atoms (linear, branched, or cyclic groups included).

The photocurable composition used in this invention can comprise one or more organic phosphites selected from any of trimethyl phosphite, triethyl phosphite, tripropyl phosphite, tributyl phosphite, triisobutyl phosphite, triamyl phosphite, trihexyl phosphite, trinonyl phosphite, tri-(ethylene glycol) phosphite, tri-(propylene glycol) phosphite, tri(isopropylene glycol) phosphite, tri-(butylene glycol) phosphite, tri-(isobutylene glycol) phosphite, tri-(pentylene glycol) phosphite, tri-(hexylene glycol) phosphite, tri-(nonylene glycol) phosphite, tri-(diethylene glycol) phosphite, tri-(triethylene glycol) phosphite, tri-(polyethylene glycol) phosphite, tri-(polypropylene glycol) phosphite, and tri-(polybutylene glycol) phosphite.

The N-oxyazinium salt efficiency amplifier, especially when it is an organic phosphite, can be present at a molar ratio to the N-oxyaziniumsalt photoinitiator of at least 0.001:1 and up to and including 10:1, or typically of at least 1:1 and up to and including 5:1.

Aromatic Heterocyclic, Nitrogen-Containing Bases:

The photocurable compositions used in the practice of this invention comprise one or more bases ("basic compounds") that are aromatic and heterocyclic in nature and comprise at least one nitrogen atom in the aromatic heterocyclic ring. Such compounds can also be substituted or unsubstituted as desired. Examples of substituents are provided below. Multiple substituents can be present if desired.

It is also essential that each of these aromatic heterocyclic, nitrogen-containing bases has a $pK_a$ of at least 10 and up to and including 22, or more typically of at least 10 and up to and including 15, as measured in acetonitrile. An experimental method for measuring $pK_a$ and the $pK_a$ values of some aromatic heterocyclic, nitrogen-containing bases are known (for example, see Kalijurand et al. J. Org. Chem. 2005, 70, 1019).

Representative aromatic heterocyclic, nitrogen-containing bases useful in this invention include but are not limited to, substituted or unsubstituted, non-polymeric pyridine, quinoline, isoquinoline, imidazole, benzimidazole, benzthiazole, thiazole, oxazole, benzoxazole, 4,4'-bipyridine, pyrazine, triazine, pyrimidine, nicotinic acid, and isonicotinic acid compounds. Mixtures of these or other unnamed compounds can be used if desired, in any useful proportion. The substituted or unsubstituted pyridine, imidazole, or thiazole compounds are particularly useful.

Alternatively, the aromatic heterocyclic, nitrogen-containing base can be provided in polymeric form such that one or more substituted or unsubstituted aromatic heterocyclic, nitrogen-containing base moieties are distributed randomly or in blocks along a polymeric backbone. Such moieties can be part of the polymeric backbone or they can be pendant thereto as, for example, in polymers derived at least in part from vinyl pyridine.

More generally, the polymer can have a polymeric backbone and further comprise substituted or unsubstituted, non-polymeric pyridine, quinoline, imidazole, benzimidazole, benzthiazole, thiazole, oxazole, benzoxazole, 4,4'-bipyridine, pyrazine, triazine, pyrimidine, nicotinic acid, or isonicotinic acid moieties distributed along the polymeric backbone.

When the aromatic heterocyclic, nitrogen-containing base compound (or polymeric moiety) is substituted, it can comprise, for example, one or more alkyl groups having 1 to 4 carbon atoms (linear or branched), one or more aryl groups such as substituted or unsubstituted phenyl groups, or one or more carboxyester groups wherein the ester moiety has 1 to 12 carbon atoms.

It is particularly useful to use a pyridine, imidazole, or thiazole compound having one or more aryl (such as phenyl), tertiary alkyl, or carboxyester substituents.

The aromatic heterocyclic, nitrogen-containing base (or mixture thereof) can be present in the photocurable composition in an amount of equal to or greater than the amount of the N-oxyazinium salt (or mixture of N-oxyazinium salts). The maximum amount of such compounds is not limited except for practical reasons and can be generally up to and including 90 mol % of the amount of the N-oxyazinium salt(s).

The useful aromatic heterocyclic, nitrogen-containing bases can be obtained from various commercial sources, or they can be prepared using known reaction conditions and starting materials.

Photocurable Acrylates:

The photocurable compositions can be used to prepare photocurable compositions by simply mixing, under "safe light" conditions, the photocurable composition, or individually, the N-oxyazinium salt photoinitiator, a photo sensitizer for the N-oxyazinium salt photoinitiator, aromatic heterocyclic, nitrogen-containing base, and an N-oxyazinium salt efficiency amplifier, with a suitable photocurable acrylate or other photocurable compound. This mixing can occur in suitable inert organic solvents if desired. Examples of suitable inert organic solvents include but are not limited to, acetone, methylene chloride, and any other inert organic solvent that does not react appreciably with the phosphite, N-oxyazinium salt photoinitiator, aromatic, nitrogen-containing base, or photosensitizer.

A liquid organic material to be polymerized or photocured (such as an acrylate) can be used as the organic solvent for mixing, or it can be used in combination with another liquid that can be an inert organic solvent. An inert organic solvent can be used also to aid in obtaining a solution of the materials and to provide suitable viscosity to the photocurable compositions for coatings, ink jet inks, or other materials or operations. However, solvent-free photocurable compositions also can be prepared by simply dissolving the N-oxyazinium salt photoinitiator, the efficiency amplifier, an aromatic heterocyclic, nitrogen-containing base, and photosensitizer in the organic photocurable material with or without mild heating.

Photocurable acrylates can be monomers, oligomers, or polymers containing one or more acrylate groups in the molecule. Such compounds include but are not limited to, various compounds having one or more ethylenically unsaturated polymerizable groups.

In some embodiments, the photocurable acrylate also includes the photosensitizer for the N-oxyazinium salt photoinitiator in the same molecule. For example, such photosensitizers can be ketocoumarin moieties that are parts of molecules that also include acrylate groups.

The photocurable resins can have a weight average molecular weight of at least 100,000.

In the photocurable compositions, a photosensitizer can be present in an amount of at least $5\times10^{-7}$ and up to and including $1\times10^{-4}$, or at least $10^{-6}$ and up to and including $5\times10^{-5}$, or more typically at least $2\times10^{-5}$ and up to and including $2\times10^{-4}$, moles per gram of photocurable acrylate.

N-oxyazinium salt photoinitiator concentrations in the photocurable composition can be specified in terms of moles of N-oxyazinium salt photoinitiator per gram of photocurable acrylate. Typical concentrations of N-oxyazinium salt photoinitiator can be at least $6\times10^{-7}$ and up to and including $6\times10^{-2}$, or typically at least $6\times10^{-6}$ and up to and including $6\times10^{-2}$, or more typically at least $6\times10^{-4}$ and up to and including $60\times10^{-2}$ moles per gram of photocurable acrylate.

In addition, the efficiency amplifier, such as a phosphite, can be present in the photocurable composition in an amount of at least $5 \times 10^{-7}$ and up to and including $1 \times 10^{-2}$, typically at least $10^{-6}$ and up to and including $5 \times 10^{-2}$, or more typically at least $10^{-4}$ and up to and including $5 \times 10^{-2}$ moles per gram of N-oxyazinium salt photoinitiator. The use of larger amounts of efficiency amplifier phosphite is possible.

The aromatic heterocyclic, nitrogen-containing base concentrations can be specified in terms of moles per mole of N-oxyazinium salt(s). Typical total concentrations of the one or more aromatic, nitrogen-containing bases can be at least 0.001 moles and up to and including 1 mole, or typically at least 0.01 moles and up to and including 1 mole per mole of total N-oxyazinium salt(s) in the photocurable composition.

The photocurable compositions described herein can also include metal-containing particles that can be pure metals, alloys, or composites of metals and inorganic or organic materials. Usually only one type of metal-containing particles are used, but it is also possible to include mixtures of metal-containing particles chosen from the same or different classes of metal-containing materials. The metal-containing particles generally have a net neutral charge.

Useful metal-containing particles include carbon-coated metal-containing particles that are composed of one or more metals (that is, pure metals or metal alloys) that are chosen from one or more classes of noble metals, semi-noble metals, Group IV metals, or combinations thereof. Useful noble metals include but are not limited to, gold, silver, palladium, platinum, rhodium, iridium, rhenium, mercury, ruthenium, and osmium. Useful semi-noble metals include but are not limited to, iron, cobalt, nickel, copper, carbon, aluminum, zinc, and tungsten. Useful Group IV metals include but are not limited to, tin, titanium, and germanium. The noble metals such as silver, palladium, and platinum are particularly useful, and the semi-noble metals of nickel and copper are also particularly useful. Tin is particularly useful in the Group IV metal class. In many embodiments, pure silver or copper particles are used. Such metal-containing particles can be at least partially surface coated with carbon. Such carbon can be amorphous, $sp^2$ hybridized, or graphene-like in nature.

Particularly useful materials are carbon-coated silver particles, carbon-coated copper particles, or in some embodiments, a mixture of carbon-coated silver particles and carbon-coated copper particles.

The carbon-coated metal particles are designed to have a median diameter that is equal to or less than 0.6 µm, or less than 0.2 µm, or more likely less than 0.1 µm. Such carbon-coated metal particles generally have a minimum median diameter of 0.005 µm.

The metal-containing particles can be dispersed in various organic solvents and can have improved dispersibility in the presence of the other essential components. Other dispersants that would be known in the art can also be present if desired. The methods used to disperse the metal particles include but are not limited to, ball-milling, magnetic stirring, high speed homogenization, high pressure homogenization, and ultrasonication.

The metal-containing particles used in the present invention can be present as individual particles, but in many embodiments, they are present as agglomerations of two or more metal particles. Such metal-containing particles can be present in any geometric shape including but not limited to, spheres, rods, prisms, cubes, cones, pyramids, wires, flakes, platelets, and combinations thereof, and they can be uniform or non-uniform in shapes and sizes. The average particle size of individual and agglomerated metal-containing particles can vary from at least 0.01 µm and up to and including 25 µm, or more likely of at least 0.02 µm and up to and including 5 µm. Although the size of the metal-containing particles is not particularly limited for practice of the present invention, optimal benefits of the present invention can be achieved using metal-containing particles as individual particles or agglomerates, having an average particle size of at least 0.02 µm and up to and including 10 µm. The particle size distribution is desirably narrow as defined as one in which greater than 50%, or typically at least 75%, of the particles have a particle size in the range of 0.2 to 2 times the average particle size. The average particle size (same as mean particle size) can be determined from the particle size distribution that can be determined using any suitable procedure and equipment including that available from Coulter or Horiba and the appropriate mathematical calculations used with that equipment.

Useful metal-containing nanoparticles can be obtained from various commercial sources, or they can be derived from various metal salts or complexes and known reduction and isolation processes prior to use in the practice of this invention. Some commercial metal particles can be obtained for example from NovaCentrix (Austin, Tex.).

The described metal-containing particles can be present in the photocurable compositions in an amount of at least 0.5 weight % and up to and including 60 weight %, based on the total weight of the photocurable composition including any inert organic solvents.

The photocurable compositions can further comprise carbon particles or carbon black in an amount of at least 0.5 weight % and up to and including 20 weight % based on the total weight of the photocurable composition including any inert organic solvents.

Moreover, the photocurable composition used in the present invention can further comprise one or more tertiary amine-substituted benzene compounds wherein the tertiary amine can comprise the same or different alkyl groups having at least 1 carbon atom in each group or cycloalkyl groups having at least 5 carbon atoms in the carbocyclic ring. These tertiary amine-substituted benzene compounds also comprise a single para substituent having a Hammett sigma value of at least +0.2 and up to and including 1.0. Such values are reported in number of text books and articles (for example see Hansch et al., *Chem Rev.*, 1991, 91, 165). For example, such substituents include but are not limited to, alkyl ester groups (or alkoxycarbonyl groups) wherein the alkyl group has at least 1 carbon atom (such as methyl ester, ethyl ester, and sulfonyl esters), alkylcarbonyl groups wherein the alkyl group has at least 1 carbon atom (such as acetyl), alkylsulfamoyl groups wherein the alkyl group has at least 1 carbon atoms, fluoroalkyl groups having 1 to 10 carbon atoms, nitrile, and iso-nitrile. The tertiary amine substituted benzene can also comprise a para- or meta-substituent which is a aromatic heterocycle including nitrogen containing heterocycles (for example, 4-pyridine and 2-pyridine).

Such tertiary amine-substituted benzene compounds can be present in the photocurable composition in an amount equal to or less than the amount of the organic phosphite. Best results are obtained when the tertiary amine-substituted benzene compound and trialkylphosphite are present in equal amounts.

Evaluation of useful components for photopolymerization or photocuring can be carried out using an acrylate-based coating formulation (see Examples below). Irradiation to initiate photocuring can be carried out using a filtered mercury lamp output through a band-pass filter. This is just one source of useful radiation. The efficiency of photopolymerization can be determined by the amount of photocrosslinked polymer retained after solvent development that leaves behind only the areas that had sufficient exposure to cause crosslinking of the photocurable acrylates. Thus, a more efficient photocurable composition can create more crosslinked polymer than a less efficient photocurable composition.

Methods of Using Photocurable Compositions

In general, the method of this invention for photocuring an acrylate-containing composition (such as a precursor composition) comprises:

mixing at least one N-oxyazinium salt photoinitiator, a photosensitizer for the N-oxyazinium salt photoinitiator, an N-oxyazinium salt efficiency amplifier, an aromatic heterocyclic, nitrogen-containing base, one or more photocurable acrylates, and optionally one or more inert organic solvents, to form a photocurable composition, wherein the aromatic heterocyclic, nitrogen-containing base has a $pK_a$ of at least 10 and up to and including 22 in acetonitrile, and irradiating the photocurable composition using suitable radiation adapted for the particular composition, to effect polymerization (or photocuring) of the one or more acrylates.

The irradiating step can be carried out in the presence of oxygen, or it can be carried out in an inert (for example, nitrogen or argon) environment. The photocurable composition can be partially or completely cured during the irradiating step, depending upon the use of the resulting "cured" composition. For example, in one use, the photocurable composition can be partially cured to increase its viscosity. Thus, the photocurable composition can be jetted out of a nozzle before partial curing from the irradiating step to modify the viscosity of the photocurable composition. The partially cured photocurable composition can then be completed cured in a second curing step, for example, after it has been applied to a substrate.

In general, the irradiating step can be carried out using radiation having a wavelength of at least 150 nm or typically at least 300 nm and up to and including 1250 nm. More typically, the irradiation can be at a wavelength of at least 300 nm and up to and including 750 nm.

As noted above, the photocurable composition can mixed in the form of a solution in an inert organic solvent that, or the photocurable composition can be mixed as a solution with at least one photocurable acrylate acting as the solvent.

In some embodiments, the photocurable composition can be applied to a substrate before the irradiating step. Such substrates include but are not limited to paper, paperstock, cardboard, plastic films, glass, ceramics, metals, composites, fabrics, or porous or non-porous surfaces, so that the photocurable composition can be applied and cured in various industries to provide hardened surfaces.

In other embodiments, the photocurable composition can be put into a mold before the irradiating step, and the cured composition can be then extracted from the mold. This would enable a user to prepare cured or photopolymerized articles of various shapes and sizes.

In some methods of the present invention a relief printing member can be used to apply the photocurable composition to a substrate in a uniform layer or in one or more predetermined patterns. Such useful relief printing members can be comprised of one or more elastomeric layers, with or without a substrate, in which a relief image can be generated using suitable imaging means. For example, the relief layer comprising a relief pattern can be disposed on a suitable substrate.

For example, the relief printing member (for example, flexographic printing member) having a relief layer comprising an uppermost relief surface and an average relief image depth (pattern height) of at least 50 µm, or typically having an average relief image depth of at least 100 µm relative from the uppermost relief surface, can be prepared from imagewise exposure of an elastomeric photopolymerizable layer in an relief printing member precursor such as a flexographic printing member precursor, for example as described in U.S. Pat. No. 7,799,504 (Zwadlo et al.) and U.S. Pat. No. 8,142,987 (Ali et al.) and U.S. Patent Application Publication 2012/0237871 (Zwadlo), the disclosures of which are incorporated herein by reference for details of such precursors. Such elastomeric photopolymerizable layers can be imaged through a suitable mask image to provide an elastomeric relief element (for example, flexographic printing plate or flexographic printing sleeve). In some embodiments, the relief layer comprising the relief pattern can be disposed on a suitable substrate as described in the noted Ali et al. patent. Other useful materials and image formation methods (including development) for provide elastomeric relief images are also described in the noted Ali et al. patent.

In other embodiments, the relief printing member can be provided from a direct (or ablation) laser-engraveable relief printing member precursor, with or without integral masks, as described for example in U.S. Pat. No. 5,719,009 (Fan), U.S. Pat. No. 5,798,202 (Cushner et al.), U.S. Pat. No. 5,804,353 (Cushner et al.), U.S. Pat. No. 6,090,529 (Gelbart), U.S. Pat. No. 6,159,659 (Gelbart), U.S. Pat. No. 6,511,784 (Hiller et al.), U.S. Pat. No. 7,811,744 (Figov), U.S. Pat. No. 7,947,426 (Figov et al.), U.S. Pat. No. 8,114,572 (Landry-Coltrain et al.), U.S. Pat. No. 8,153,347 (Veres et al.), U.S. Pat. No. 8,187,793 (Regan et al.), and U.S. Patent Application Publications 2002/0136969 (Hiller et al.), 2003/0129530 (Leinenback et al.), 2003/0136285 (Telser et al.), 2003/0180636 (Kanga et al.), and 2012/0240802 (Landry-Coltrain et al.).

As noted above, average relief image depth (relief pattern) or an average relief pattern height in the relief pattern is at least 50 µm or typically at least 100 µm relative to the uppermost relief surface. A maximum relief image depth (relief pattern) or relief pattern height can be as great as 1,000 µm, or typically up to and including 750 µm, relative to the uppermost relief surface.

Thus, a method of this invention can include providing a relief printing member as described above to print a suitable pattern of the photocurable composition described herein. The present invention enables printing of a variety of photocurable compositions over relatively large areas with desirable resolution (for example, a line width of less than 20 µm or even less than 15 µm). In some embodiments, the resolution (line width) can be as low as 5 µm or even as low as 1 µm. The method also provides a means for printing of sequential overlying patterns without hindering the utility of one or more underlying layers. The method can be adapted to high-speed production processes for the fabrication of electronic devices and components.

The photocurable composition can be applied in a suitable manner to the uppermost relief surface (raised surface) in the elastomeric relief element. Application of the photocurable composition can be accomplished using several suitable means. Thus, it is desirable that as much as possible of the photocurable composition is applied predominantly to the uppermost relief surface. Anilox roller systems or other roller application systems, especially low volume Anilox rollers, below 2.5 billion cubic micrometers per square inch (6.35 billion cubic micrometers per square centimeter) and associated skive knives are used in flexographic printing presses are particularly advantageous for this application of the photocurable composition. Optimum metering of the printable material composition onto the uppermost relief surface only can be achieved by controlling the photocurable composition viscosity or thickness, or choosing an appropriate application means.

The photocurable composition can have a viscosity during this application of at least 1 cps (centipoise) and up to and including 1000 cps.

The photocurable composition can be applied at any time after the relief image is formed within a relief printing member. The photocurable composition can be applied by any suitable means, including the use of an Anilox roller system, which can be one of the most useful ways for application to the uppermost relief surface. The thickness of the photocurable composition on the relief image is generally limited to a sufficient amount that can readily be transferred to a substrate but not too much to flow over the edges of the relief element in the recesses when the photocurable composition is applied to the relief printing member.

A substrate is provided on which a desired pattern of a photocurable composition is formed using a relief printing member. This substrate can be composed of any suitable material including but are not limited to, polymeric films, metals, silicon or ceramics, fabrics, papers, and combinations thereof (such as laminates of various films, or laminates of papers and films) provided that a pattern of a photocurable composition can be formed on at least one receptive surface thereof. The substrate can be transparent or opaque, and rigid or flexible. The substrate can include one or more polymeric or non-polymeric layers or one or more patterns of other materials before the pattern of photocurable composition is applied according to the present invention. A surface of the substrate can be treated for example with a primer layer or electrical or mechanical treatments (such as graining) to render that surface a "receptive surface" to achieve suitable adhesion of the photocurable composition.

In some embodiments, the substrate comprises a separate receptive layer as the receptive surface disposed on a substrate, which receptive layer and substrate can be composed of a material such as a suitable polymeric material that is highly receptive of the photocurable composition. In particular, the receptive layer can be chosen from the materials described above that are receptive to the photocurable composition that forms the desired pattern on the substrate with high resolution. The receptive layer generally has a dry thickness of at least 0.05 µm and up to and including 10 µm, or typically of at least 0.05 µm and up to and including 3 µm, when measured at 25° C.

A surface of the substrates can be treated by exposure to corona discharge, mechanical abrasion, flame treatments, or oxygen plasmas, or by coating with various polymeric films, such as poly(vinylidene chloride) or an aromatic polysiloxane as described for example in U.S. Pat. No. 5,492,730 (Balaba et al.) and U.S. Pat. No. 5,527,562 (Balaba et al.) and U.S. Patent Application Publication 2009/0076217 (Gommans et al.), to make that surface more receptive to the photocurable composition.

Suitable substrates materials include but are not limited to, metallic films or foils, metallic films on polymer, glass, or ceramic supports, metallic films on electrically conductive film supports, semi-conducting organic or inorganic films, organic or inorganic dielectric films, or laminates of two or more layers of such materials. For example, useful substrates can include indium-tin oxide coated glass, indium-tin oxide coated polymeric films, poly(ethylene terephthalate) films, poly(ethylene naphthalate) films, polyimide films, polycarbonate films, polyacrylate films, polystyrene films, polyolefin films, polyamide films, silicon, metal foils, cellulosic papers or resin-coated or glass-coated papers, glass or glass-containing composites, ceramics, metals such as aluminum, tin, and copper, and metalized films. The substrate can also include one or more charge injection layers, charge transporting layers, and semi-conducting layers on which the photocurable composition pattern is formed.

Particularly useful substrates are polyesters films such as poly(ethylene terephthalate), polycarbonate, or poly(vinylidene chloride) films that have been surface-treated as noted above, or coated with one or more suitable adhesive or subbing layers, the outer layer being receptive to the photocurable composition. A useful outer layer can be a vinylidene chloride polymer containing layer.

Useful substrates can have a desired dry thickness depending upon their eventual uses, for example their incorporation into various articles or devices (for example optical devices, optical panels, or touch screens). For example, the dry thickness can be at least 0.001 mm and up to and including 10 mm, and especially for polymeric films, the dry thickness can be at least 0.008 mm and up to and including 0.2 mm.

A transfer pressure can be applied to either the relief printing member or the substrate to assure contact and complete transfer of the photocurable composition to the substrate. For example, transfer of the photocurable composition can be carried out by moving the uppermost relief surface of the relief printing member relative to the substrate, by moving the substrate relative to the uppermost relief surface of the relief printing member, or by relative movement of both elements to each other. In some embodiments, the photocurable composition is transferred to the substrate manually. In other embodiments, the transfer is automated such as by example, by a conveyor belt, reel-to-reel process, directly driven moving fixtures, chain, belt, or gear-driven fixtures, frictional roller, printing press, or rotary apparatus, or any combination of these methods.

The substrate and relief printing member can be kept in contact for as little as 10 milliseconds or up to 10 seconds or as much as 60 seconds or more. Once the desired contact is completed, the relief printing member is separated from the substrate to leave a desired pattern of the photocurable composition on the substrate. At least 70 weight % of the photocurable composition that was originally disposed on the uppermost relief surface of the relief printing member (using one or more applications of photocurable composition) is transferred to the substrate in a desired pattern.

Separation of the relief printing member and the substrate can be accomplished using any suitable means including but not limited to, manual peeling apart, impingement of gas jets or liquid jets, or mechanical peeling devices.

In general, transferring the photocurable composition from the raised uppermost relief surface of the relief printing member to the substrate creates a pattern of the photocurable composition on the substrate to be cured as described below. The transferring can be referred to as "printing" (or lamination or embossing). The pattern of the photocurable composition on the substrate can comprise lines, solid areas, dots, or a mixture of lines and solid areas in any desired pattern that text, numbers, shapes, or other images, or combinations thereof. In general, the average line width for printed lines in a pattern on the substrate can be less than 20 µm or even less than 15 µm and as wide as 2 µm. Such lines can also have an average height of at least 10 nm and up to and including 4,000 µm. These average dimensions can be determined by measuring the lines in at least 10 different places and determining the width or height using known image analysis tools including but not limited to, profilometry, optical microscopic techniques, atomic force microscopy, and scanning electron microscopy.

While a particularly useful method of applying the photocurable composition to the substrate includes the use of flexography and the relief printing member is a flexographic printing member comprising a relief image, the photocurable composition can also be applied to a substrate using alternative appropriate printing methods (intaglio or gravure printing) that would be readily apparent to one skilled in the art using the teaching provided herein.

In some of the embodiments, the method of this invention provides a printed pattern of fine lines of a photocurable composition that, after curing, can contain a seed material for a subsequent electroless plating process. For example, for copper electroless plating, such seed materials include but are not limited to, metals such as palladium, tin, nickel, platinum, iridium, rhodium, and silver, or a mixture of tin and palladium.

Method of Using Photocurable Compositions

Once the photocurable composition described herein has been applied to a suitable substrate in a patternwise fashion to form a pattern of the photocurable composition on the substrate, the pattern of the photocurable composition can be exposed to suitable photocuring radiation to form a photocured pattern on the substrate.

Thus, once the photocurable composition has been "printed", the resulting pattern is exposed in the presence of oxygen, or it can be carried out in an inert (for example, nitrogen or argon) environment. In general, the exposing can be carried out using radiation having a wavelength of at least 150 nm or typically at least 300 nm and up to and including 1250 nm. More typically, the irradiation can be at a wavelength of at least 150 nm and up to and including 750 nm. A mixture of exposure wavelengths can be used during the photocuring process.

The following Examples are provided as an illustration of the practice of this invention. These Examples show the effect of the added photoinitiator efficiency amplifier, that is a phosphite in most embodiments of the present invention, on the overall quantum yield of decomposition of N-oxyazinium salt via photoinduced electron transfer from a photo sensitizer.

Comparative Example 1

Quantum yield of 2-chlorothioxanthone (S-2) photosensitized reaction of N-methoxy-4-phenylpyridinium hexafluorophosphate (OZ-1) in acetonitrile-$d_3$:

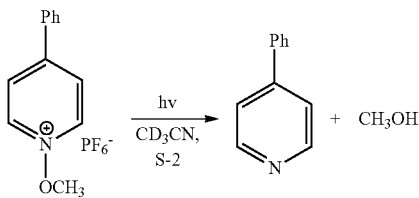

The 2-chlorothioxanthone(S-2) (0.002 mole) sensitizer was added to a 3 ml solution of 0.02 molar N-methoxy-4-phenylpyridinium hexafluorophosphate (OZ-1) in acetonitrile-$d_3$. In a 1×1 cm quartz cell, this solution was purged with a thin stream of argon for 2-3 minutes and then irradiated at 405 nm for 5 minutes. Argon or nitrogen was continuously passed through the reaction mixture during photolysis to purge as well as stir the solution. After photolysis, a $^1$H NMR spectrum of the photolysate was recorded and the percent conversion of the starting materials was determined by integration of diagnostic signals. For example, before photolysis the $^1$H NMR spectrum of a solution of N-methoxy-4-phenylpyridinium hexafluorophosphate and a catalytic amount of 2-chlorothioxanthone in acetonitrile-$d_3$ shows characteristic signals due to the N-methoxypyridinium salt OZ-1 [δ: 8.94 (m, 2H), 8.35 (m, 2H), 7.94 (m, 2H), 7.69 (m, 3H), and 4.43 (s, 3H)]. After irradiation at 405 nm for about 2 minutes, the $^1$H NMR spectrum of the photolysate clearly showed appearance of new diagnostic signals due to formation of 4-phenylpyridine [δ: 8.71 (m, 2H) and 8.26 (m, 2H) and CH$_3$OH (δ: 3.30)]. The identity of these products was established by comparison with $^1$H NMR spectra of authentic samples. The yields of the photoproducts were determined from quantitative integration of diagnostic signals of starting materials, N-methoxy-4-phenylpyridinium (OZ-1), and product, 4-phenylpyridine, in $^1$H NMR spectra of the reaction mixtures. Conversions were kept between 15-20% to minimize any secondary photolysis of the products. The photon flux at the excitation wavelengths, 405 nm, was determined by using the known photocycloaddition reaction of phenanthrenequinone to trans-stilbene in benzene as an actinometer (Bohning, J. J.; Weiss, K. J. Am. Chem. Soc. 1966, 88, 2893.). The light intensity was within 7-10×10$^{-8}$ Einsteins min$^{-1}$. The quantum yield of reaction was determined by dividing the moles of photoproduct formed by total light intensity and is shown below in TABLE IV.

Comparative Example 2

Amplified quantum yield of 2-chlorothioxanthone (S-2) photosensitized reaction of N-methoxy-4-phenylpyridinium hexafluorophosphate (OZ-1) and triethylphosphite in acetonitrile-$d_3$:

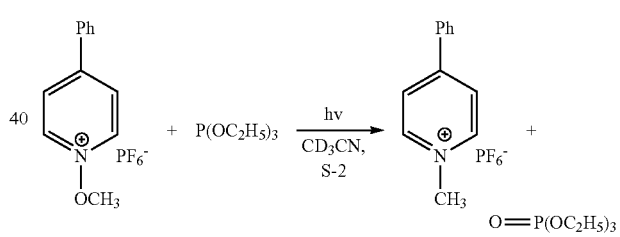

The 2-chlorothioxanthone (S-2) (0.002 mole) sensitizer was added to a 3 ml solution of 0.02 molar N-methoxy-4-phenylpyridinium hexafluorophosphate (OZ-1) and 0.02 M triethylphosphite in acetonitrile-$d_3$. In a 1×1 cm quartz cell, this solution was purged with a thin stream of argon for 2-3 minutes and then irradiated at 405 nm for 30 seconds. Argon or nitrogen was continuously passed through the reaction mixture during photolysis to purge as well as stir the solution. After photolysis, $^1$H NMR spectrum of the photolysate was recorded and the percent conversion of the starting materials was determined by integration of diagnostic signals. Before photolysis, the $^1$H NMR spectrum of an solution of OZ-1, triethylphosphite and a catalytic amount of 2-chlorothioxanthone in acetonitrile-$d_3$ shows characteristic signals due to the N-methoxypyridinium salt (δ: 8.94 (m, 2H), 8.35 (n, 2H), 7.94 (m, 2H), 7.69 (m, 3H), and 4.43 (s, 3H)), triethylphosphite ((δ: 3.84 (quintet, 6H), 1.23 (t, 9H)). After irradiation at 405 nm for about 30 seconds, the $^1$H NMR spectrum of the photolysate clearly showed appearance of new diagnostic signals due to formation of 4-phenylpyridine (δ: 8.71 (m, 2H) and 8.26 (m, 2H) and triethylphosphite (δ: 4.06 (quintet, 6H)

and 1.30 (t, 9H)), N-methyl-4-phenylpyridinium (δ: 4.30 (s, 3H)). The identity of these products was established by comparison with $^1$H NMR spectra of authentic samples. The yields of the photoproducts were determined from quantitative integration of $^1$H NMR spectra of the reaction mixtures containing products N-methyl-4-phenylpyridinium signal at δ: 4.30 relative to starting material N-methoxy signal of OZ-1 at δ: 4.43, as well as signals due to product triethylphosphate at δ: 4.06 relative to starting material triethylphosphite at δ: 3.84. Conversions were kept between 15-20% to minimize any secondary photolysis of the products. The photon flux at the excitation wavelengths, 405 nm, was determined by using the known photocycloaddition reaction of phenanthrenequinone to trans-stilbene in benzene as an actinometer (Bohning, J. J.; Weiss, K. *J. Am. Chem. Soc.* 1966, 88, 2893.). The light intensity was within $7\text{-}10 \times 10^{-8}$ Einsteins $\text{min}^{-1}$. The quantum yield of reaction was determined by dividing the moles of photoproducts formed by total light intensity and is shown below in TABLE IV.

Invention Example 1

The photocurable composition described above for Comparative Example 2 was formulated but 0.02 molar of 4-phenylpyridine was added as an aromatic heterocyclic, nitrogen-containing base having a $pK_a$ of at least 10 and up to and including 22 in acetonitrile. The quantum yield of reaction was determined by dividing the moles of photoproducts formed by total light intensity and is shown below in TABLE IV.

TABLE IV

Reaction of Triplet Sensitized Reaction of N-Oxyazinium Salts with and without Phosphite: Effect of Concentration of N-Oxyazinium on Quantum Yields.

| | Photocurable Composition | Amount of Triethylphosphite | Quantum Yield |
|---|---|---|---|
| Comparative Example 1 | 0.002 molar S-2 + 0.02 molar OZ-1 | 0 | 0.95 |
| Comparative Example 2 | 0.002 molar S-2 + 0.02 molar OZ-1 | 0.02 molar | 30.0 |
| Invention Example 1 | 0.002 molar S-2 + 0.04 molar OZ-1 + 0.02M 4-phenylpyridine | 0.02 molar | 75 |

The data in TABLE IV clearly show that the quantum yields of reaction of N-oxyazinium salt OZ-1, by photoinduced electron transfer from S-2, are greatly amplified in the presence of the added triethylphosphite in Comparative Example 2 relative to Comparative Example 1 when no triethylphosphite was added. However, much greater quantum yield (or quantum efficiency) was achieved using the photocurable composition (Invention Example 1) that also contained the aromatic heterocyclic, nitrogen-containing base, 4-phenylpyridine.

Comparative Example 3

To a mixture of multifunctional acrylates (10 g, 8:2 by weight mixture of polyethylene glycol 200 diacrylate (SR259) and dipentaerythritol pentaacrylate ester (SR399) (both from Sartomer), 2-chlorothioxanthone photosensitizer S-2 (14.2 mg, $5.7 \times 10^{-5}$ moles) and 4-phenyl-N-methoxypyridinium hexafluorophosphate N-oxyazinium salt OZ-1 (40.5 mg, $1.2 \times 10^{-4}$ moles) were added and dissolved at room temperature. Each photocurable composition was then coated onto a glass plate and exposed to 405 nm radiation in air. After this irradiation, the samples were washed with acetone and the photocuring efficiency was measured in terms of the amount of crosslinked polymer left. The results are summarized in TABLE V below.

Comparative Example 4

To a mixture of multifunctional acrylates (10 g, 8:2 by weight mixture of polyethylene glycol 200 diacrylate (SR259) and dipentaerythritol pentaacrylate ester (SR399) (both from Sartomer), 2-chlorothioxanthone photosensitizer S-2 (12.2 mg, $5.7 \times 10^{-5}$ moles) and 4-phenyl-N-methoxypyridinium hexafluorophosphate N-oxyazinium salt OZ-1 (40.5 mg, $1.2 \times 10^{-4}$ moles) were added and dissolved at room temperature. The mixture was split in two equal parts and in a second part, triethylphosphite efficiency amplifier (63 mg, $7.7 \times 10^{-4}$ moles) was added. The photocurable composition was then coated onto a glass plate and exposed to 405 nm radiation in air. After irradiation, the sample was washed with acetone and the cure efficiency measured in terms of the amount of crosslinked polymer left. The results are summarized below in TABLE V.

TABLE V

Effect of Efficiency Phosphite on Photocuring in Air

| Photocurable Composition | Degree of Curing | Material left after Solvent Wash? |
|---|---|---|
| Comparative Example 3 | No | No |
| Comparative Example 4 | Extensive curing | Yes |

These results clearly show that in the presence of the efficiency amplifier phosphite (Comparative Example 4), photocuring of the photocurable composition was extensive relative to Comparative Example 3.

The following Examples compare the photocuring speed of a photocurable composition containing no efficiency amplifier trialkylphosphite, a photocurable composition comprising a trialkylphosphite, a photocurable composition comprising a trialkylphosphite in combination with an aromatic heterocyclic, nitrogen-containing base, and a photocurable composition comprising a trialkylphosphite, an aromatic, heterocyclic, nitrogen-containing base, and a tertiary amine containing benzene compound.

Comparative Example 5

To a mixture of multifunctional acrylates (10 g, 8:2 by weight mixture of polyethylene glycol 200 diacrylate (SR259) and dipentaerythritol pentaacrylate ester (SR399) (both from Sartomer), 2-chlorothioxanthone photosensitizer S-2 (12.2 mg, $5.7 \times 10^{-5}$ moles) and 4-phenyl-N-methoxypyridinium hexafluorophosphate N-oxyazinium salt OZ-1 (40.5 mg, $1.2 \times 10^{-4}$ moles) were added and dissolved at room temperature. The photocurable composition was then coated onto a glass plate and exposed to 405 nm radiation under $N_2$. After irradiation, the sample was washed with acetone and cure efficiency measured in terms of the amount of crosslinked polymer left. The results are summarized below in TABLE VI.

Comparative Example 6

To a mixture of multifunctional acrylates (10 g, 8:2 by weight mixture of polyethylene glycol 200 diacrylate (SR259) and dipentaerythritol pentaacrylate ester (SR399) (both from Sartomer), 2-chlorothioxanthone photosensitizer S-2 (12.2 mg, 5.7×10$^{-5}$ moles) and 4-phenyl-N-methoxypyridinium hexafluorophosphate N-oxyazinium salt OZ-1 (40.5 mg, 1.2×10$^{-4}$ moles) were added and dissolved at room temperature and triethylphosphite efficiency amplifier (50 mg, 3×10$^{-4}$ moles) was added to the formulation. The photocurable composition was then coated onto a glass plate and exposed to 405 nm radiation under N$_2$. After irradiation, the sample was washed with acetone and the cure efficiency was measured in terms of the amount of crosslinked polymer left. The results are summarized below in TABLE VI.

TABLE VI

Effect of Efficiency Amplifier Triethylphosphite on Cure Speed

| Photocurable Composition | Dose Required for Complete Photocuring |
|---|---|
| Comparative Example 5 OZ-1 + S-2 | 120 mJ/cm$^2$ |
| Comparative Example 6 OZ-1 + S-2 + Triethylphosphite | 15 mJ/cm$^2$ |

These results clearly show that in the use of the efficiency amplifier (Comparative Example 6) provided quite rapid photocuring of the photocurable composition (by a factor of 8) relative to the photocurable composition used in Comparative Example 5.

Invention Example 2

To a mixture of multifunctional acrylates (10 g, 8:2 by weight mixture of polyethylene glycol 200 diacrylate (SR259) and dipentaerythritol pentaacrylate ester (SR399) (both from Sartomer), 2-chlorothioxanthone photosensitizer S-2 (12.2 mg, 5.7×10$^{-5}$ moles) and 4-phenyl-N-methoxypyridinium hexafluorophosphate N-oxyazinium salt OZ-1 (40.5 mg, 1.2×10$^{-4}$ moles) were added and dissolved at room temperature. Triethylphosphite efficiency amplifier (50 mg, 3×10$^{-4}$ moles) and 4-phenylpyridine (50 mg, 8×10$^{-4}$ moles) were then added to the formulation. The resulting photocurable composition was then coated onto a glass plate and exposed to 405 nm radiation under N$_2$. After irradiation, the sample was washed with acetone and the cure efficiency was measured in terms of the amount of crosslinked polymer left. The results are summarized below in TABLE VII.

TABLE VII

Effect of Aromatic Heterocyclic, Nitrogen-containing Base on Cure Speed

| Photocurable Composition | Dose Required for Complete Photocuring |
|---|---|
| Comparative Example 6 OZ-1 + S-2 + Triethylphosphite | 15 mJ/cm$^2$ |
| Invention Example 2 OZ-1 + S-2 + Triethylphosphite + 4-Phenylpyridine | 8 mJ/cm$^2$ |

These results clearly show that use of an aromatic heterocyclic, nitrogen-containing base in conjunction with the efficiency amplifier phosphite provided enhanced photocuring rate (by a factor of 2) relative to the photocurable composition used in Comparative Example 6.

Invention Example 3

To a mixture of multifunctional acrylates (10 g, 8:2 by weight mixture of polyethylene glycol 200 diacrylate (SR259) and dipentaerythritol pentaacrylate ester (SR399) (both from Sartomer), 2-chlorothioxanthone photosensitizer S-2 (12.2 mg, 5.7×10$^{-5}$ moles) and 4-phenyl-N-methoxypyridinium hexafluorophosphate N-oxyazinium salt OZ-1 (40.5 mg, 1.2×10$^{-4}$ moles) were added and dissolved at room temperature. Triethylphosphite efficiency amplifier (50 mg, 3×10$^{-4}$ moles), a tertiary amine ethyl-4-dimethylamino benzoate (EDAB, 50 mg, 2×10$^{-4}$ moles) and 4-phenylpyridine (100 mg, 8×10$^{-4}$ moles) were then added to the formulation. The resulting photocurable composition was then coated onto a glass plate and exposed to 405 nm radiation under N$_2$. After irradiation, the sample was washed with acetone and the cure efficiency was measured in terms of the amount of crosslinked polymer left. The results are summarized below in TABLE VIII.

TABLE VIII

Effect of Various Photocurable Compositions on Curing Speed

| Photocurable Composition | Dose Required for Complete Photocuring |
|---|---|
| Comparative Example 6 OZ-1 + S-2 + Triethylphosphite | 15 mJ/cm$^2$ |
| Invention Example 2 OZ-1 + S-2 + Triethylphosphite + 4-Phenylpyridine | 8 mJ/cm$^2$ |
| Invention Example 3 OZ-1 + S-2 + Triethylphosphite + 4-Phenylpyridine + EDAB | 2 mJ/cm$^2$ |

The invention has been described in detail with particular reference to certain preferred embodiments thereof, but it will be understood that variations and modifications can be effected within the spirit and scope of the invention.

The invention claimed is:

1. A method of photocuring an acrylate-containing composition comprising:
mixing at least one N-oxyazinium salt photoinitiator, a photosensitizer for the N-oxyazinium salt, an N-oxyazinium salt efficiency amplifier, an aromatic heterocyclic, nitrogen-containing base, one or more photocurable acrylates, and optionally, one or more inert organic solvents, to form a photocurable composition, wherein:
the aromatic heterocyclic, nitrogen-containing base has a pK$_a$ of at least 10 and up to and including 22 in acetonitrile,
the aromatic heterocyclic, nitrogen-containing base is present in the photocurable composition in an amount equal to or greater than the amount of the N-oxyazinium salt photoinitiator,
the photosensitizer is present in the photocurable composition in an amount of at least 10$^{-7}$ and up to and including 5×10$^{-5}$ moles per gram of one or more photocurable acrylates,
the N-oxyazinium salt photoinitiator is present in the photocurable composition in an amount of at least 6×10$^{-4}$ and up to and including 60×10$^{-2}$ moles per gram of one or more photocurable acrylates, and
the efficiency amplifier is present in the photocurable composition in an amount of at least 5×10$^{-7}$ and up to and including 1×10$^{-2}$ moles per gram of N-oxyazinium salt photoinitiator, and irradiating the photocurable composition to effect polymerization of the one or more photocurable acrylates, wherein the N-oxyazinium salt efficiency amplifier is an organic phosphite having the formula:

(R'O)₃P wherein the multiple R' groups are the same or different alkyl groups having 1 to 20 carbon atoms, or the organic phosphite is chosen from trimethyl phosphite, triethyl phosphite, tripropyl phosphite, tributyl phosphite, triisobutyl phosphite, triamyl phosphite, trihexyl phosphite, trinonyl phosphite, tri-(ethylene glycol) phosphite, tri-(propylene glycol) phosphite, tri(isopropylene glycol) phosphite, tri-(butylene glycol) phosphite, tri-(isobutylene glycol) phosphite, tri-(pentylene glycol) phosphite, tri-(hexylene glycol) phosphite, tri-(nonylene glycol) phosphite, tri-(diethylene glycol) phosphite, tri-(triethylene glycol) phosphite, tri-(polyethylene glycol) phosphite, tri-(polypropylene glycol) phosphite, and tri-(polybutylene glycol) phosphite.

2. The method of claim 1, wherein the aromatic heterocyclic, nitrogen-containing base is a non-polymeric pyridine, quinoline, isoquinoline, imidazole, benzimidazole, benzthiazole, thiazole, oxazole, benzoxazole, 4,4'-bipyridine, pyrazine, triazine, pyrimidine, nicotinic acid, or isonicotinic acid, or it is a polymer having a backbone and non-polymeric pyridine, quinoline, imidazole, benzimidazole, benzthiazole, thiazole, oxazole, benzoxazole, 4,4'-bipyridine, pyrazine, triazine, pyrimidine, nicotinic acid, or isonicotinic acid moieties distributed along the backbone.

3. The method of claim 1, wherein the aromatic heterocyclic, nitrogen-containing base is a pyridine, imidazole, or thiazole.

4. The method of claim 1, wherein the irradiating step is carried out in the presence of oxygen.

5. The method of claim 1, wherein the photocurable composition is partially cured during the irradiating step.

6. The method of claim 1, wherein the photocurable composition is applied to a substrate in a patternwise fashion after mixing but before irradiation, using a flexographic printing member.

7. The method of claim 1, wherein the N-oxyazinium salt photoinitiator is represented by either of the following Structures (I) and (II):

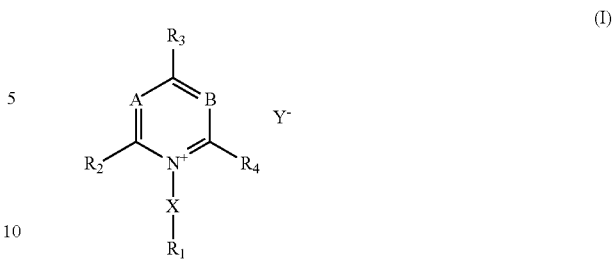

wherein A and B in Structure (I) independently represent a carbon, C—$R_5$, C—$R_6$ or nitrogen, X is O, $R_1$, $R_2$, $R_3$, $R_4$, $R_5$, and $R_6$ are independently hydrogen, or alkyl or aryl groups, any of the A, B, and R groups where chemically feasible can be joined to form a ring, and Y is a charge balancing anion that can be a separate moiety or part of an A, B, or R,

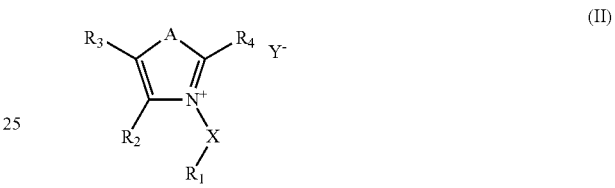

wherein A in Structure (II) represents a carbon, C—$R_5$, nitrogen, sulfur or oxygen atom with sufficient bonds and substituents to form a heteroaromatic ring, X is O, $R_1$, $R_2$, $R_3$, $R_4$, and $R_5$ are independently hydrogen, or alkyl or aryl groups, or any two R groups may form a ring, and Y is a charge balancing anion that can be a separate moiety or part of an R group.

8. The method of claim 1, wherein the photosensitizer for the N-oxyazinium salt photoinitiator has a triplet energy of at least 20 kcal/mole of N-oxyazinium salt.

9. The method of claim 1, wherein the one or more photocurable acrylates include the photosensitizer for the N-oxyazinium salt photoinitiator in the same molecule.

10. The method of claim 1, wherein the photocurable composition further comprises metal-containing particles or carbon particles.

* * * * *